July 21, 1964    J. L. BENNETT ETAL    3,141,359
ACCESSORY HOLDER FOR TOOL OR APPLIANCE
Filed Aug. 11, 1961    2 Sheets-Sheet 1
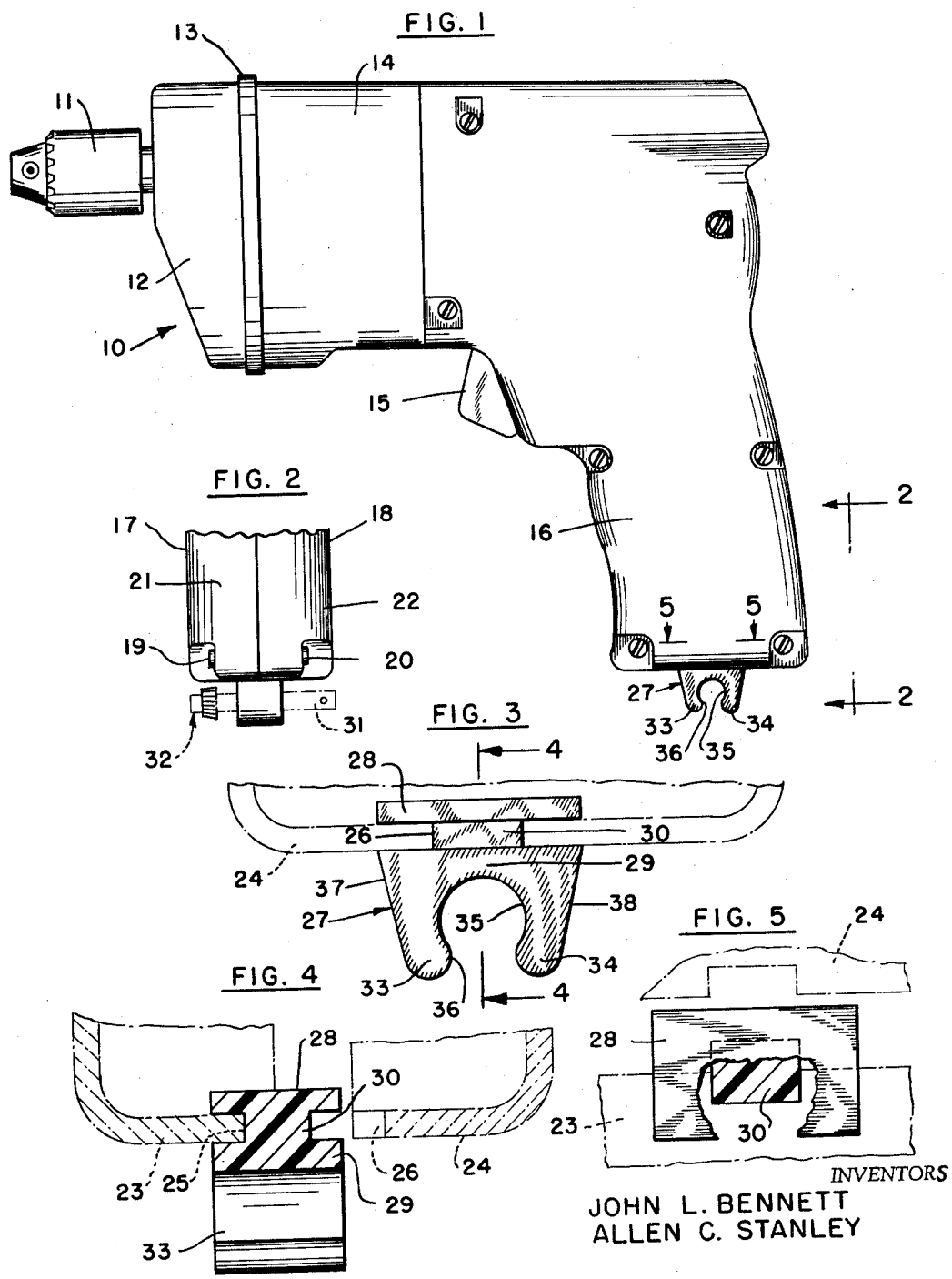
INVENTORS
JOHN L. BENNETT
ALLEN C. STANLEY
BY *Leonard Bloom*
ATTORNEY July 21, 1964   J. L. BENNETT ETAL   3,141,359
ACCESSORY HOLDER FOR TOOL OR APPLIANCE
Filed Aug. 11, 1961   2 Sheets-Sheet 2

INVENTOR
JOHN L. BENNETT
ALLEN C. STANLEY
BY Leonard Bloom
ATTORNEY

_United States Patent Office_

3,141,359
Patented July 21, 1964

3,141,359
ACCESSORY HOLDER FOR TOOL OR APPLIANCE
John L. Bennett and Allen C. Stanley, Baltimore, Md., assignors to The Black and Decker Manufacturing Company, Towson, Md., a corporation of Maryland
Filed Aug. 11, 1961, Ser. No. 130,912
1 Claim. (Cl. 77—7)

The present invention relates to an accessory holder for a tool, appliance, or other device, and more particularly, to a chuck key holder for a portable electric drill.

A chuck key is used occasionally, if not habitually, in conjunction with the use and operation of a portable electric drill; and a variety of chuck key holders have heretofore been developed for retaining the chuck key in convenient relationship to the drill, such that the operator will have the chuck key handy and within his reach at all times. Such chuck key holders of the prior art generally fall within two categories: one, the chuck key is stored within some portion of the tool housing, such as the handle; or two, the chuck key is retained by means of a holder, usually a strap, that in turn is secured to the conventional electrical cord of the drill. The first method is disadvantageous in that it requires a modification of the tool structure or housing, makes the overall tool bulky and cumbersome, and is usually relatively expensive. The second method, while being relatively inexpensive and requiring no modification to the tool structure, is nevertheless impossible where the drill is of the type which eliminates the conventional electrical cord.

Accordingly, it is in connection with electric drills or other devices, wherein self-contained rechargeable energy cells are employed, that the present invention (although not necessarily confined thereto) may nevertheless find more particular utility. One such device in particular is described in the copending Butler et al. application S.N. 102,819, filed April 13, 1961, entitled "High-Efficiency Cordless Electric Drill," and assigned to the same assignee as that of the present invention.

It is an object of the present invention to provide, for use with a tool, appliance, or device, an accessory holder which is trapped within the housing of the tool, and which has a portion external of the housing for retaining the accessory externally of the tool.

It is another object of the present invention to provide an accessory holder that may be molded easily and economically in a single one-piece construction.

It is yet another object of the present invention to provide, for use with a portable electric drill of the type having a split-housing pendant handle, a chuck key holder which is disposed below the pendant handle of the drill.

It is yet still another object of the present invention to provide a split-housing comprising a pair of relatively thin-walled complementary mating halves, each of the walls having a recess, and the recesses communicating with each other when the halves are secured together, in combination with a chuck key holder having an intermediate portion adapted to be received within the communicating recesses for trapping the chuck key holder within the housing.

It is a further object of the present invention to provide a chuck key holder trapped between the mating halves of a split-housing portable electric drill, wherein the chuck key holder includes a pair of external ears having an opening therebetween, the ears being capable of being spread slightly apart, whereby the shank of the chuck key may be inserted within the opening to be frictionally gripped between the ears of the holder.

It is a still further object of the present invention to provide a one-piece chuck key holder comprising an internal portion, an external portion having means included therein for receiving and holding the chuck key, and an integral intermediate portion trapped between the communicating recesses formed within the split-housing pendant handle of the drill.

These and other objects of the present invention will become apparent from a reading of the following specification, taken in conjunction with the enclosed drawings, in which:

FIGURE 1 is a side elevational view of a portable electric drill, for example of the cordless type, showing the external portion of the chuck key holder projecting below the lowermost portion of the pendant handle of the drill;

FIGURE 2 is a view taken along the lines 2—2 of FIGURE 1, showing the handle split into two halves, and further showing the shank of a chuck key (in broken lines) as being retained within the chuck key holder;

FIGURE 3 is a top plan view of the chuck key holder, showing one of the mating halves of the split-housing handle in broken lines;

FIGURE 4 is a view taken along the lines 4—4 of FIGURE 3, showing the pair of complementary mating halves of the split-housing handle in the process of trapping the chuck key holder within the housing;

Figure 6:
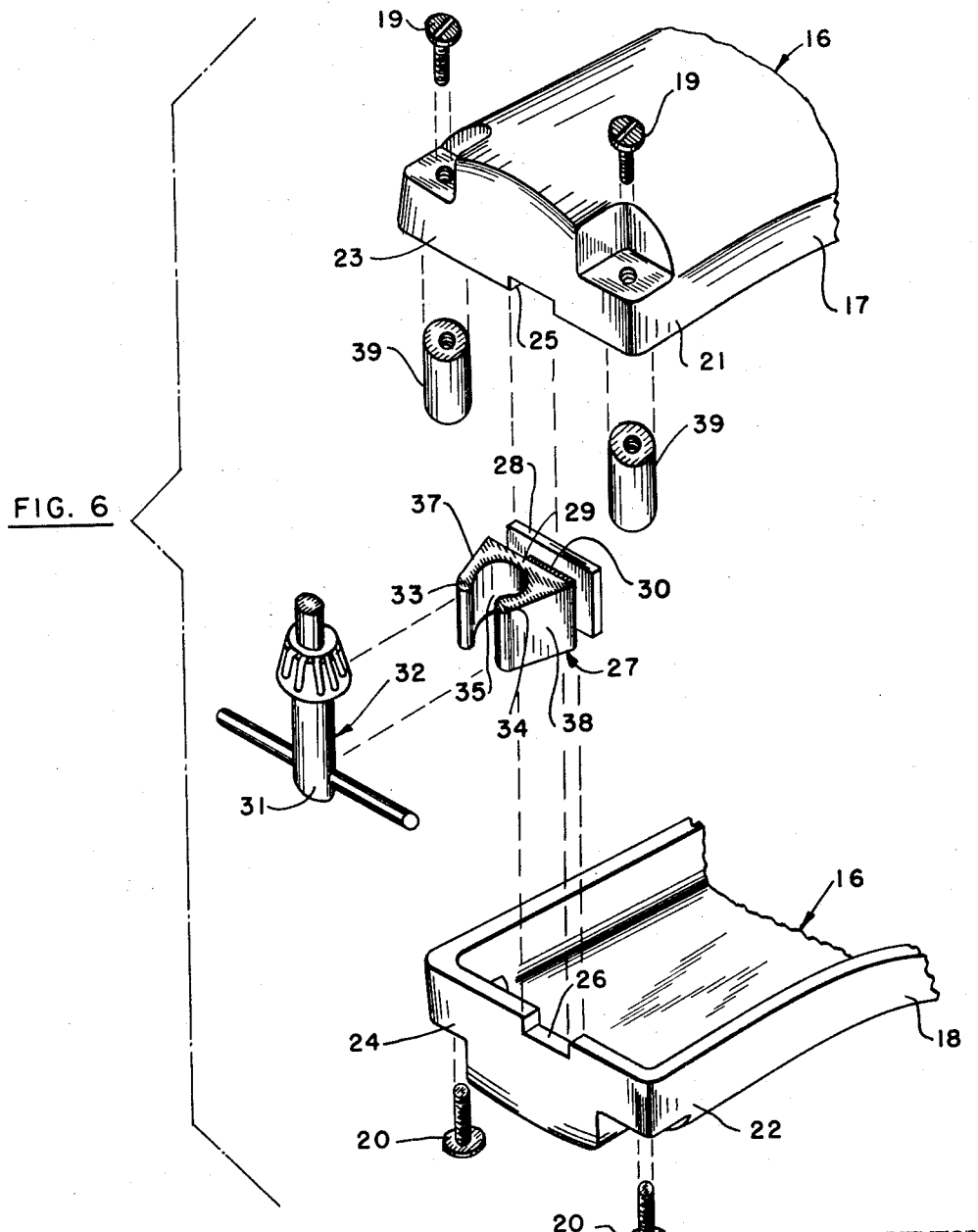

FIGURE 5 is a view taken along the lines 5—5 of FIGURE 1, with part of the inner portion of the chuck key holder being broken away to show the integral intermediate portion in cross-section, and with the split-housing being shown in broken lines in partial exploded relationship to the chuck key holder; and FIGURE 6 is a perspective view showing in exploded relationship the pair of mating halves of the split-housing handle, the one-piece chuck key holder, the chuck key, and the means for securing the mating halves together.

With reference to FIGURE 1, there is illustrated a portable electric drill 10, preferably but not necessarily of the cordless type, having a chuck 11, gear case 12, gear case cover 13, field case 14, trigger switch 15, and a pendant handle 16; and with reference to FIGURES 1, 2, and 6, the pendant handle 16 is of the split-housing type comprising a pair of complementary mating halves 17 and 18 detachably secured together by means of screws 19 and 20 and intervening internally-threaded spacer sleeves 39.

With reference to FIGURES 3, 4, 5, and 6, the mating halves 17 and 18 are each substantially hollow and include relatively thin-walled lowermost portions 21 and 22 terminating in substantially flat lowermost walls 23 and 24. The walls 23 and 24 are co-planar with respect to each other (when the halves 17 and 18 are secured together); and each of the walls has a recess 25 and 26, respectively. Preferably, the recesses 25 and 26 are rectangular, and the recesses communicate with each other to form a continuous rectangular opening when the mating halves 17 and 18 are secured together. As shown more particularly in FIGURE 3, the chuck key holder 27 has a one-piece molded construction, being preferably made of hard rubber or plastic, and comprises an internal portion 28, an external portion 29, and an intermediate integral portion 30. The intermediate portion 30 is preferably rectangular and has outer dimensions corresponding roughly to that of the communicating recesses 25 and 26, while the internal portion 28 is substantially flat, is rectangular in plan outline, lies in a plane parallel to the co-planar walls 23 and 24, and has outer dimensions which are larger than those of the intermediate portion 30. In such a manner, the chuck key holder 27 is trapped within the pendant handle 16 when the mating halves 17 and 18 are secured together.

The external portion 29 of the chuck key holder 27 has means formed or included therein for receiving and holding the shank 31 of a conventional chuck key 32.

More specifically, the external portion 29 comprises a pair of ears 33 and 34 having an an opening 35 therebetween. Opening 35 is substantially circular in cross-section (see FIGURE 3) and terminates outwardly in an externally-accessible mouth portion 36, and the diameter of opening 35 corresponds substantially to the diameter of the shank 31 of the chuck key 32. The ears 33 and 34 have respective tapered side edges 37 and 38, and the ears 33 and 34 are capable of being spread slightly apart.

In such a manner, the shank 31 of the chuck key 32 may be inserted through the mouth portion 36 to be received within the opening 35 and hence frictionally gripped between the ears 33 and 34.

Obviously, many modifications may be made without departing from the basic spirit of the present invention; and accordingly, within the scope of the appended claim, the invention may be practiced other than has been specifically described.

We claim:

In a portable electric drill, wherein a chuck key is occasionally used in conjunction with the drill: the combination of a pendant handle having a split-housing comprising a pair of complementary mating halves detachably secured together along a common longitudinal midplane, one of said mating halves constituting the cover for the other, each of said mating halves having a lowermost hollow portion including a substantially-flat lowermost wall, said walls being co-planar and each of said walls being reatively thin and having a rectangular recess formed therein, said rectangular recesses communicating with each other when said mating halves are secured together, and a one-piece chuck key holder integrally-molded from a resilient material and comprising an internal portion, an intermediate portion, and an external portion, said intermediate portion having a rectangular cross-sectional shape and size corresponding to that of said communicating recesses in said housing, said internal portion having a larger cross-sectional shape and size than that of said intermediate portion, whereby said molded chuck key holder may be trapped between said mating halves of said split-housing handle as said halves are secured together, and said external portion of said chuck key holder comprising a pair of ears having respective outer side surfaces which are tapered, with the tapers converging towards each other in a direction away from said substantially-flat lowermost wall of said pendant handle, said ears having a cylindrical opening formed therebetween, the axis of which is parallel to said substantially-flat lowermost wall of said pendant handle, spaced therefrom, and transverse to said common plane of said mating halves, the diameter of said cylindrical opening corresponding to the diameter of the shank portion of said chuck key, and said ears further having a mouth portion formed between their respective extremities, said mouth portion communicating with said cylindrical opening and having a width which is less than the diameter of said opening, whereby said ears of said external portion of said resilient integrally-molded holder may be spread apart slightly to receive the shank of said chuck key through said mouth portion and into said cylindrical opening to thereby frictionally grip said chuck key.

References Cited in the file of this patent

UNITED STATES PATENTS

| | | |
|---|---|---|
| 2,693,541 | Pratt | Nov. 2, 1954 |
| 2,710,949 | Happe et al. | June 14, 1955 |
| 2,941,426 | Muller et al. | June 21, 1960 |
| 3,049,946 | Schelke | Aug. 21, 1962 |